US00RE46400E

(19) United States
(12) Reissued Patent
Hong

(10) Patent Number: US RE46,400 E
(45) Date of Reissued Patent: May 9, 2017

(54) METHOD FOR ELIMINATING BLOCKING EFFECT IN COMPRESSED VIDEO SIGNAL

(71) Applicant: LG Electronics Inc., Seoul (KR)

(72) Inventor: Min-Cheol Hong, Seoul (KR)

(73) Assignee: LG ELECTRONICS INC., Seoul (KR)

(21) Appl. No.: 14/471,972

(22) Filed: Aug. 28, 2014

Related U.S. Patent Documents

Reissue of:
(64) Patent No.: Re. 43,709
Issued: Oct. 2, 2012
Appl. No.: 11/709,212
Filed: Feb. 20, 2007

Which is a Reissue of:
(64) Patent No.: 6,859,558
Issued: Feb. 22, 2005
Appl. No.: 09/730,745
Filed: Dec. 7, 2000

(30) Foreign Application Priority Data

Dec. 8, 1999 (KR) ..... 1999-55678

(51) Int. Cl.
*G06K 9/36* (2006.01)
*G06K 9/46* (2006.01)
*H04N 19/86* (2014.01)
*H04N 19/80* (2014.01)

(52) U.S. Cl.
CPC ..... *H04N 19/86* (2014.11); *H04N 19/80* (2014.11)

(58) Field of Classification Search
CPC ..... H04N 19/80; H04N 19/86
USPC ..... 382/236, 250, 251, 255, 260, 263, 264, 382/268, 272; 375/240.16, 240.2, 240.22, 375/240.24
See application file for complete search history.

(56) References Cited

U.S. PATENT DOCUMENTS 5,390,264 A * 2/1995 Ishihara et al. ..... 382/260
5,568,199 A * 10/1996 Kajimoto ..... H04N 19/176 375/240.03
5,590,064 A * 12/1996 Astle ..... 708/203
(Continued)

*Primary Examiner* — Adam L Basehoar
(74) *Attorney, Agent, or Firm* — Dentons US LLP

(57) ABSTRACT

The present invention relates to a method for eliminating a blocking effect in a compressed video signal signal. The method of the invention includes: the encoding step of eliminating a blocking effect by compensating the motion of a signal compressed in block unit to be transmitted; the decoding step of restoring the motion compensated video signal to the original video signal by reducing the prediction residual between the motion compensated video signal and the original video signal and the blocking effect; and the post-filtering step of performing post-filtering in a blocking elimination filter in order to eliminate a blocking effect and ring effect remained in the compensated signal. The equation for obtaining the original pixel is made simple by eliminating the remaining blocking effect and ring effect using a loop/post filter. In addition, normalization parameters can be stored in the look-up table and can be detected according to the difference between pixels adjacent to the original pixel and the size of quantizaiton, whereby the equation for restoring the compressed moving video signal, resulting in excessive smoothing, becomes simpler, and filtering control is made possible by a simple equation, thus making a high speed real time video signal processing possible.

18 Claims, 2 Drawing Sheets

(56) References Cited

U.S. PATENT DOCUMENTS 5,636,295 A * 6/1997 Kim ..... 382/251
5,844,614 A 12/1998 Chong et al.
5,877,813 A 3/1999 Lee et al.
5,883,983 A 3/1999 Lee et al.
5,974,197 A 10/1999 Lee et al.
6,028,967 A * 2/2000 Kim et al. ..... 382/268
6,041,145 A * 3/2000 Hayashi et al. ..... 382/268
6,178,205 B1 * 1/2001 Cheung et al. ..... 375/240.29
6,192,081 B1 * 2/2001 Chiang et al. ..... 375/240.16
6,222,881 B1 4/2001 Walker
6,259,823 B1 7/2001 Lee et al.
6,285,801 B1 * 9/2001 Mancuso et al. ..... 382/268
6,317,522 B1 * 11/2001 Rackett ..... 382/268
6,320,905 B1 11/2001 Konstantinides
6,324,301 B1 11/2001 Jacquin
6,353,680 B1 3/2002 Hazra
6,360,024 B1 3/2002 Tan
6,449,311 B1 9/2002 Ozcelik
6,510,178 B1 1/2003 Fimoff
6,535,643 B1 * 3/2003 Hong ..... 382/232
6,539,060 B1 3/2003 Lee et al.
6,539,120 B1 3/2003 Sita
6,539,124 B2 * 3/2003 Sethuraman et al. ..... 382/251
6,614,847 B1 9/2003 Das
6,665,346 B1 12/2003 Lee et al.
6,728,414 B1 * 4/2004 Chang et al. ..... 382/254
6,879,723 B1 * 4/2005 Helman ..... 382/232
6,882,685 B2 * 4/2005 Malvar ..... G06F 17/147 375/240.03
7,212,571 B2 * 5/2007 Bhaskaran et al. ..... 375/240.03
7,283,588 B2 * 10/2007 Bjontegaard ..... 375/240.01
7,539,248 B2 * 5/2009 Kwon et al. ..... 375/240.24
7,627,187 B2 * 12/2009 Bossen ..... G06F 17/147 375/240.2
8,867,615 B1 * 10/2014 Wang ..... H04N 19/176 375/240.01
2006/0177142 A1 * 8/2006 Zhou ..... H04N 19/176 382/248

* cited by examiner

METHOD FOR ELIMINATING BLOCKING EFFECT IN COMPRESSED VIDEO SIGNAL

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue; a claim printed with strikethrough indicates that the claim was canceled, disclaimed, or held invalid by a prior post-patent action or proceeding.

CROSS-REFERENCE TO RELATED APPLICATIONS

[[*More than one reissue application has been filed for the reissue of*]] This application is a Reissue Application of U.S. Reissue Pat. No. Re. 43,709, reissued on Oct. 2, 2012, which is a reissue of *U.S. Pat. No. 6,859,558,* [[*including reissue application Ser Nos. 11/709,212 (the present application), and 12/333,501, now abandoned, which is a divisional reissues of reissue application Ser. No. 11/709,212. The present application is a reissue application of U.S. patent application Ser. No. 09/730,745, filed Dec. 7, 2000, now U.S. Pat. No. 6,859,558,*]] issued Feb. 22, 2005, *which claims priority from Korean Application No. 1999-55678, filed on Dec. 8, 1999*, each of which is hereby incorporated by reference as if fully set forth herein.

BACKGROUND OF THE INVENTION

1. Field of the Invention

The present invention relates to a method for eliminating a blocking effect in a compressed video signal, and more particularly, to a method for eliminating a blocking effect using a loop/post filter in H.26L moving picture compression method.

2. Description of the Background Art

Generally, a hybrid MC-DCT technique employing a basic algorithm, such as H.261, H.263, MPEG1, MPEG4, etc., is used as a method for compressing a moving picture. In the hybrid MC-DCT technique, spatial and temporal redundancy of an video signal to be compressed is removed.

FIG. 1 is a block diagram illustrating an video encoding unit, which including a first switching unit 2 for controlling an input video signal; a DCT unit 3 for performing a discrete cosine transform operation of the video signal; a quantization unit 4 for quantizing the discrete cosine transform signal to output a quantized DCT coeffcient; an encoding controller unit 5 for controlling the first switching unit 2 and the quantization unit 4 and outputting INTRA/INTER information (p=mtype;flag for INTRA/INTER), transmission information(t;flag for transmitted or not), and quantization information(qz;Qp; quantizer indication); an inverse quantization unit 6 for inversely quantizing the value outputted from the quantization unit 4; an inverse DCT unit 7 for performing an inverse DCT operation of the inversely quantized signal to restore the same; a loop filter 9 for compensating the motion picture by searching for the motion vector of the restored signal; and an video memory 10 for storing the compensated video signal.

The operation of the thusly constructed video encoding unit will be described as follows.

When an video signal is inputted from the outside, the inputted video signal is subtracted from a differential signal stored in the video memory 10, said subtracted video signal being inputted into the first switching unit 2. The first switching unit 2 switches the appropriate signal of the subtracted video signal and the differential signal stored in the video memory to input the same to the DCT unit 3, the DCT unit 3 performing a discrete cosine transform operation of the inputted signal to output the same to the quantization unit 4. The quantization unit 4 quantizes the inputted signal to output a quantized DCT coefficient(q). The quantized signal can be adapted to the pixel value of a still picture or moving picture, or transform coefficients of a pixel.

At this time, the encoding controller 5 controls an video signal input switching process of the first switching unit 2 and a quantization process of the quantization unit 4 to output INTRA/INTER information(p=mtype;flag for INTRA/INTER), transmission information(t;flag for transmitted or not), and quantization information(qz;Qp; quantizer indication).

Meanwhile, the signal outputted from the quantization unit is inversely quantized in the inverse quantization unit 6, the inversely quantized signal being inputted into the inverse DCT unit 7 and inversely DCT-processed to thus be restored to the original signal. The restored signal is added to a signal selected from a second switching unit 11 in an adder 8 to be stored in the video memory 10. The second switching unit 11 selects the appropriate signal between the signal selected from the first switching unit 2 and the signal outputted from the video memory 10 to thus be outputted to an adder. The video memory 10 outputs a motion compensated video signal to the subtractor 1, and outputs a motion vector information (v=MV;motion vector).

However, in case of compressing a moving picture using the hybrid motion compensation discrete cosine transform technique, a blocking effect and ring effect occur in the video signal reconstructed at an video decoding unit due to the loss of information generated in the quantization process.

To eliminate the blocking effect in the video signal, a loop filter 9 is inserted between the adder 8 and video memory 10 of the video encoding unit. The loop filter 9 reduces the blocking effect by searching for the motion vector information of the filtered video signal.

In case of transforming the video signal in order to search for the motion vector information of the video signal, the video can be taken throughout the entire video, or can be taken by dividing the same into block units of a predetermined size.

However, in a case that the transform and quantization process is performed in block units of 4×4 size, a blocking effect occurs apparently at a low transmission bit rate, though a blocking effect and a ring effect are reduced as compared to the conventional art In addition, in the quantization process, as the value of the size of quantization becomes higher, compression efficiency becomes higher. However, because the loss of information is increased, a phenomenon that an video is visually unclear is occurred.

This phenomenon can be described by classifying the same into a blocking effect and a ring effect by using the hybrid MC/DCT compression method.

The blocking effect is caused by the result that the entire video is shown as being divided into blocks since the video signal is divided into a predetermined size and each block is independently processed, and by the loss of information of a low frequency region occurring in the quantization process.

The ring effect is caused by the loss of high frequency information due to the quantization process after block transform, which occurs since the contour line of a moving picture is formed in a water waver shape.

Among a number of methods for eliminating such a blocking effect or ring effect, the H.26L standardized compression method developed in the ITU-T is recently used. In the H.26L standardized compression method, a blocking effect is eliminated by using the loop filter in the video encoding unit and the video decoding unit, and a blocking effect or ring effect is eliminated that has not been processed completely in the loop filter by using the post filter. In the H.26L standard method, unlike the conventional compression algorithm, an video is processed in block units of 4×4 size, and a variable block unit motion compensation method is used. In addition, in the quantization and inverse quanatization method, changes in size of quantization is nonlinearly defined, unlike the conventional method.

However, this method is inefficient because the loop filter is used only for an intra frame, the video signal restored after post-filtering is redundantly smoothed, and a prediction residual between the video signal of which the motion is compensated by the loop filter and the original video signal is increased.

To solve the above problem, the low pass filtering(LPF) method and the normalization restoration method are proposed.

The low pass filtering method is a method for reducing a blocking effect and a ring effect by obtaining a pixel value according to a designated filter coefficient value by selecting a plurality of pixels around a certain pixel.

However, the low pass filtering method has a problem that the quality of the restored video signal is redundantly smoothed according to the type and compression factor of the video signal, since the value of a filter tap or filter coefficient for eliminating a blocking effect is set according to an experimental value.

The normalization restoration method is a method for eliminating a blocking effect by obtaining the statistical characteristics of an video signal by calculating the value of marginal portions at four sides of a block and the degree of non-uniformity in the block. In the normalization restoration method, there is difficulty processing in real time, because calculation is performed on each video signal, and the equation for the calculation has a matrix form, thus requiring a large computational complexity. In addition, when calculated normalized coefficients determine the degree of smoothness, the average value is applied irrespective of the degree of non-uniformity, thereby reducing adaptability.

For example, in a case that the normalized coefficient value applied to a region having a serious blocking effect or a region having a reduced blocking effect, the region having a reduced blocking effect is redundantly smoothed.

SUMMARY OF THE INVENTION

Accordingly, it is an object of the present invention to provide a method for eliminating a blocking effect in a compressed video signal in which compression efficiency is increased by decreasing the prediction residual between an original video signal and a motion compensated video signal by a loop filter, and a compressed video signal is restored to the optimized state by not allowing the quality of the compressed video signal to be redundantly smoothed.

To achieve the above object, there is provided a method for eliminating a blocking effect in a compressed video signal according to the present invention which includes: the encoding step of eliminating a blocking effect by compensating the motion of a signal compressed in block unit to be transmitted; the decoding step of restoring the motion compensated video to the original video by reducing the prediction residual between the motion compensated video and the original video and the blocking effect; and the post-filtering step of performing post-filtering in a blocking elimination filter in order to eliminate a blocking effect and ring effect remained in the compensated signal.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiment of the present invention will now be described with reference to the accompanying drawings.

Figure 1:
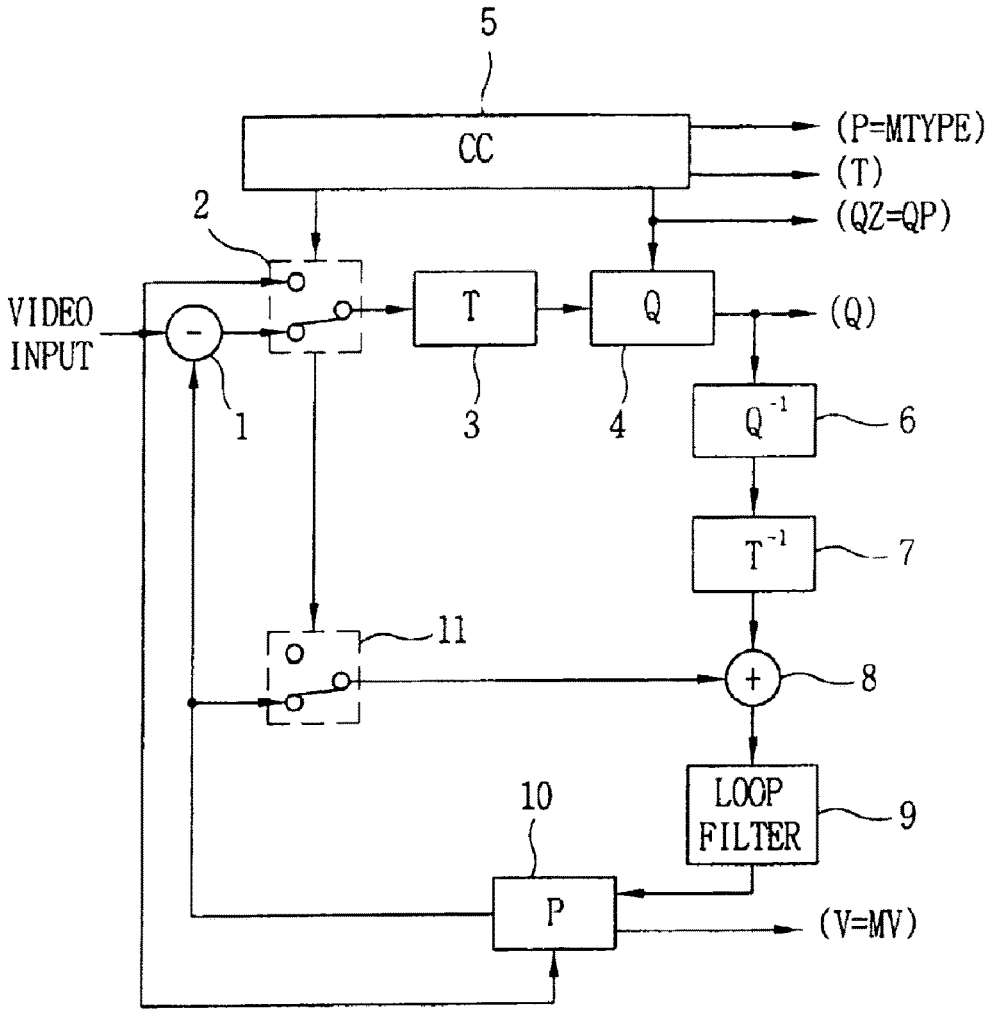
FIG. 1 CONVENTIONAL ART
FIG. 1 is a block diagram illustrating an video encoding unit according to the conventional art.
Figure 2:
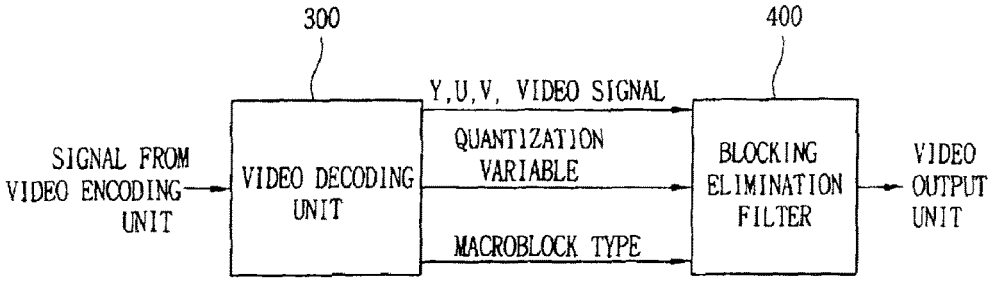
FIG. 2 is a block diagram illustrating a configuration in which a compressed video signal is restored according to the present invention.

FIG. 2 is a block diagram illustrating a configuration in which a compressed video signal is restored according to the present invention. When a compressed video signal is transmitted from the outside, the transmitted signal is inputted to a decoding unit 300, the decoding unit 300 decoding the inputted video signal, thus outputting Y, U, and V video, a quantized variable, and a macroblock type. The outputted signal is inputted to a blocking elimination filter 400 to output an video from which a blocking effect and a ring effect remaining in the signal are removed.

The operation of the components of the present invention will be described in detail with reference to FIGS. 2 and 3 by taking H.26L algorithm by example.

First, a loop filter of an video decoding unit according to the conventional art reduces the prediction residual between a motion compensated video and the original video for thereby outputting an video signal in which a blocking effect and ring effect are reduced. The configuration of the video encoding unit is the same as in the conventional art, so it will be omitted. Thereafter, the signal outputted from the video encoding unit is inputted into an video decoding unit 300. The configuration of the video decoding unit 300 are identical to those of the video encoding unit, except that the video decoding unit 300 is configured in the reverse order of the video encoding unit.

The loop filter of the video decoding unit 300 rearranges the compressed and transmitted video on a spatial region in block unit, and restores the same to the original video by reconfiguring the rearranged video.

Figure 3:
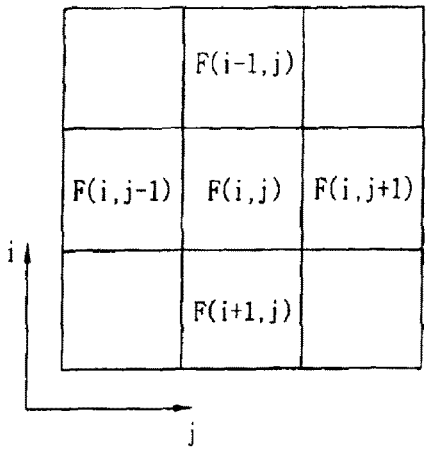
FIG. 3 is a view illustrating the position of pixels of a compressed video signal according to the present invention.

That is, the video reconfigured in the decoding unit 300 when the original video is transmitted in a compressed format equals to the value obtained by adding a residual to the original signal. In case of block transform in order to restore the video signal, the reliability of the original pixel and the degree of smoothing of each pixel are expressed by the normalization method as follows.

$$G(i,j)=f(i,j)+residual \quad (1)$$

$$M(f(i,j))=M_L(f(i,j))+M_R(f(i,j))+M_U(f(i,j))+M_D((f(i,j)) \quad (2)$$

f(i, j); original video signal g(i, j); video signal reconfigured in decoding unit M(f(i, j)) function of the reliability of original pixel and degree of smoothing of each pixel (i, j); position value of pixel indicating the position of two-dimensional video The position of the pixels is explained in FIG. 3.

FIG. 3 is a view illustrating the position of pixels of a compressed video according to the present invention. A pixel adjacent to the original video pixel f(i, j) in a left horizontal direction is denoted by f(i, j−1), a pixel adjacent thereto in a right horizontal direction is denoted by f(i, j+1), a pixel adjacent thereto in an upper vertical direction is denoted by f(1−1, j), and a pixel adjacent thereto in a lower vertical direction is denoted by f(i+1, j).

When the position of a pixel adjacent to the original pixel is designated as described above, $M_L$ designates a function of the reliability and degree of smoothing of pixel f(1, j−1) with respect to pixel f(i, j), $M_R$ designates a function of the reliability and degree of smoothing of pixel f(1, j+1) with respect to pixel f(i, j), and $M_U$ designates a function of the reliability and degree of smoothing of pixel f(i−1, 1) with respect to pixel f(i, j).

The reliability and degree of smoothing of a pixel adjacent to the original pixel are expressed by the following equations.

$$M_L(f(i,j))=(1-\alpha_L(f(i,j)))[g(i,j)-f(i,j)]^2+\alpha_L(f(i,j))[f(i,j)-f(i,j-1)]^2 \quad (3)$$

$$M_R(f(i,j))=(1-\alpha_L(f(i,j)))[g(i,j)-f(i,j)]^2+\alpha_R(f(i,j))[f(i,j)-f(i,j+1)]^2 \quad (4)$$

$$M_U(f(i,j))=(1-\alpha_L(f(i,j)))[g(i,j)-f(i,j)]^2+\alpha_U(f(i,j))[f(i,j)-f(i-1,j)]^2 \quad (5)$$

$$M_D(f(i,j))=(1-\alpha_L(f(i,j)))[g(i,j)-f(i,j)]^2+\alpha_D(f(i,j))[f(i,j)-f(i+1,j)]^2 \quad (6)$$

$\alpha_L$, $\alpha_R$, $\alpha_U$, $\alpha_D$ are normalized parameters that determine the ratio of the reliability and degree of smoothing of each pixel with respect to the original pixel.

The first term of the right side of $M_L(f(i, j))$ represents the reliability of the original pixel obtained by subtracting the original pixel f(i, j) and the compressed pixel g(i, j), and the second term of the right side thereof represents the degree of non-uniformity of the pixel in the left horizontal direction, e.g., the degree of smoothing of pixel f(i, j−1) with respect to the original pixel f(i, j) by obtaining the difference between the original pixel f(i, j) and the left side pixel f(i, j−1). $\alpha_L$ is a kind of normalized parameter that determines the ratio of the reliability and degree of smoothing of the compressed video with respect to the original video. As this value becomes higher, the weight on the degree of smoothing becomes higher for thereby increasing the degree of smoothing.

The first term of the right side of $M_R(f(i, j)$ represents the reliability of the original pixel obtained by subtracting the original pixel f(i, j) and the compressed pixel g(i, j), and the second term of the right side thereof represents the degree of non-uniformity of the pixel in the right horizontal direction, e.g., the degree of smoothing of pixel f(i, j+1) with respect to the original pixel f(i, j) by obtaining the difference between the original pixel f(i, j) and the right side pixel f(i, j+1). $\alpha_R$ is a kind of normalized parameter that determines the ratio of the reliability and degree of smoothing of the compressed video with respect to the original video. As this value becomes higher, the weight on the degree of smoothing becomes higher for thereby increasing the degree of smoothing.

The first term of the right side of $M_U(f(i, j))$ represents the reliability of the original pixel obtained by subtracting the original pixel f(i, j) and the compressed pixel g(i, j), and the second term of the right side thereof represents the degree of non-uniformity of the pixel in the upper vertical direction, e.g., the degree of smoothing of pixel f(i −1, j) with respect to the original pixel f(i, j) by obtaining the difference between the original pixel f(i, j) and the upper side pixel f(i−1, j). $\alpha_U$ is a kind of normalization parameter that determines the ratio of the reliability and degree of smoothing of the compressed video with respect to the original video. As this value becomes higher, the weight on the degree of smoothing becomes higher for thereby increasing the degree of smoothing.

The first term of the right side of $M_D(f(i, j))$ represents the reliability of the original pixel obtained by subtracting the original pixel f(i, j) and the compressed pixel g(i, j), and the second term of the right side thereof represents the degree of non-uniformity of the pixel in the lower vertical direction, e.g., the degree of smoothing of pixel f(i+1, j) with respect to the original pixel f(i, j) by obtaining the difference between the original pixel f(i, j) and the lower side pixel f(i+1, j). $\alpha_D$ is a kind of normalized parameter that determines the ratio of the reliability and degree of smoothing of the compressed video with respect to the original video. As this value becomes higher, the weight on the degree of smoothing becomes higher for thereby increasing the degree of smoothing.

According to the above-described equation, the restored pixel f(i, j) can be obtained according to the compressed video reconfigured in the decoding unit, the normalization parameters, the constant value of the parameter for differently setting the degree of smoothing based on the position of a pixel, and the size of quantization of the pixel encoded to an intra macroblock by the normalization restoration method.

The above described original video signal f(i, j) can be expressed by the following equations.

$$f(i,j)=[(4-\alpha_{TOT}g(i,j)+\alpha_L(f(i,j))g(i,j-1)+\alpha_R(f(i,j))g(i,j+1)+\alpha_U(f(i,j))g(i-1,j)+\alpha_D f(i,j))g(i+1,j)]/4 \quad (7)$$

$$\alpha_{TOT}(f(i,j))-\alpha_L(f(i,j))+\alpha_R(f(i,j))+\alpha_U(f(i,j))+\alpha_D f(i,j)) \quad (8)$$

$$\alpha_L(f(i,j)=[K_LQP^2(f(i,j))]/[[g(i,j)-g(i,j-1)]^2+K_LQP^2(f,(i,j))] \quad (9)$$

$$\alpha_R(f(i,j)=[K_RQP^2(f(i,j))]/[[g(i,j)-g(i,j+1)]^2+K_RQP^2(f(i,j))] \quad (10)$$

$$\alpha_U(f(i,j)=[K_UQP^2(f(i,j))]/[[g(i,j)-g(i-1,j)]^2+K_UQP^2(f(i,j))] \quad (11)$$

$$\alpha_D(f(i,j)=[K_DQP^2(f(i,j))]/[[g(i,j)-g(i+1,j)]^2+K_DQP^2(f(i,j))] \quad (12)$$

$\alpha_L$, $\alpha_R$, $\alpha_U$, $\alpha_D$ are normalized parameters that determine the ratio of the reliability and degree of smoothing of each pixel with respect to the original pixel.

$\alpha_{TOT}$; sum of parameters for each pixel

K; constant value of normalization parameter $\alpha$ for each pixel

QP(f(i, j)) size of quantization of pixel encoded to intra macroblock.

QP(f(i, j))=[676]/[A(f(i, j))], $\alpha_L$ is a normalization parameter that determines the degree of smoothing of a pixel in the left direction from the pixel of the compressed video positioned at (i, j), $\alpha_R$ is a normalization parameter that determines the degree of smoothing of a pixel in the right direction from the pixel of the compressed video positioned at (i, j), $\alpha_U$ is a normalization parameter that determines the degree of smoothing of a pixel in the upper direction from the pixel of the compressed video positioned at (i, j), and $\alpha_D$ is a normalization parameter that determines the degree of smoothing of a pixel in the downward direction from the pixel of the compressed video positioned at (i, j).

The normalization parameters $\alpha_L$, $\alpha_R$, $\alpha_U$, and $\alpha_D$ are integers and are stored in a memory.

QP(f(i, j)) is the size of quantization of the pixel positioned at (i, j) encoded to intra macroblocks, which is calculated by quantizer A of the H.26L compression type as described in the conventional art.

The quantization error of each pixel is proportional to the function of a quantization variable set in macroblock unit, and a blocking effect occurring in block margins has a higher degree of non-uniformity than a ring effect in intra blocks. Thus, the values of the normalization parameters $\alpha_L$, $\alpha_R$, $\alpha_U$, and $\alpha_D$ can be obtained by the set theory saying that such characteristics must controlled according to the position information of each pixel, by selling the normalization parameters for controlling the degree of smoothing as a large value.

In a case that the compressed video is restored by dividing the same into blocks, it is often the case that the degree of non-uniformity of pixels adjacent to block marginal portions is higher than the degree of non-uniformity of pixels in intra blocks. In a case that the loop filter of the video decoding unit 300 and video decoding unit 300 restores the compressed video, the prediction residual between the motion compensated video and the original video is increased for thus excessively smoothing the compressed video. Thus, loop filtering of the pixel positioned in block margins encoded to the intra macroblocks is performed, thus reducing the excessive smoothing of the compressed video.

At this time, the normalization parameters $\alpha_L$, $\alpha_R$, $\alpha_U$, and $\alpha_D$ that determine the degree of smoothing of a pixel in the left, right, upper, and downward directions from the original pixel of the compressed video positioned at (i, j) are determined by constant values $K_L$, $K_R$, $K_U$, and $K_D$. $K_L$, $K_R$, $K_U$ and $K_D$ are determined by experimental values obtained by the loop filter of the video decoding unit 300.

The equations for obtaining $K_L$, $K_R$, $K_U$ and $K_D$ are as follows.

$$K_L(f(i,j))=[2, \text{ if } j \bmod 4=0;\ 0, \text{ otherwise}] \tag{13}$$

$$K_R(f(i,j))=[2, \text{ if } j \bmod 4=3;\ 0, \text{ otherwise}] \tag{14}$$

$$K_U(f(i,j))=[2, \text{ if } i \bmod 4=0;\ 0, \text{ otherwise}] \tag{15}$$

$$K_D(f(i,j))=[2, \text{ if } i \bmod 4=3;\ 0, \text{ otherwise}] \tag{16}$$

Using the constant K determined by the above method and the normalization parameters, the compressed video signal is filtered by the video decoding unit 302 for thereby restoring the original pixel f(i, j).

However, the above loop filtering method is disadvantageous in that floating points are operated to thus increase computational complexity. To solve the above problem, the denominator and the numerator in the equation for obtaining the original video signal are respectively made into an integer by multiplying both denominator and numerator by $2^8$=256, thus reducing the computational complexity.

The above description will be expressed by $$f(i,j)=[(2^{10}-\beta_{TOT})g(i,j)+\beta_L(f(i,j))g(i,j-1)+\beta_R(f(i,j))g(i,j+1)+\beta_U(f(i,j))g(i-1,j)+\beta_D(f(i,j))g(i+1,j)]/(2^{10}) \tag{17}$$

$$\beta_{TOT}(f(i,j)=\beta_L(f((i,j))+\beta_R(f(i,j))+\beta_U(f(i,j))+\beta_D(f(i,j)) \tag{18}$$

$$\beta_L(f(i,j))=2^8\alpha_L(f(i,j))=2^8[K_L(f(i,j))QP^2(f(i,j))]/[[g(i,j)-g(i,j-1)]^2+K_L(f(i,j))QP^2(f(i,j))] \tag{19}$$

$$\beta_R(f(i,j))=2^8\alpha_R(f(i,j))=2^8[K_R(f(i,j))QP^2(f(i,j))]/[[g(i,j)-g(i,j-1)]^2+K_R(f(i,j))QP^2(f(i,j))] \tag{20}$$

$$\beta_U(f(i,j))=2^8\alpha_U(f(i,j))=2^8[K_U(f(i,j))QP^2(f(i,j))]/[[g(i,j)-g(i,j-1)]^2+K_U(f(i,j))QP^2(f(i,j))] \tag{21}$$

$$\beta_D(f(i,j))=2^8\alpha_D(f(i,j))=2^8[K_D(f(i,j))QP^2(f(i,j))]/[[g(i,j)-g(i,j-1)]^2+K_D(f(i,j))QP^2(f(i,j))] \tag{22}$$

$\beta_{TOT}(f(i, j))$ is the sum of normalization parameters that determine the degree of smoothing of a pixel adjacent to the pixel of the compressed video positioned at (i, j).

$\beta_L(f(i, j))$ is a normalization parameter that determine the degree of smoothing of a pixel in the left direction from the pixel of the compressed video positioned at (i, j).

$\beta_R(f(i, j))$ is a normalization parameter that determine the degree of smoothing of a pixel in the right direction from the pixel of the compressed video positioned at (i, j).

$\beta_U(f(i, j))$ is a normalization parameter that determine the degree of smoothing of a pixel in the upper direction from the pixel of the compressed video positioned at (i, j).

$\beta_D(f(i, j))$ is a normalization parameter that determine the degree of smoothing of a pixel in the downward direction from the pixel of the compressed video positioned at (i, j).

As described above, when the denominator and numerator multiplied by $2^8$=256, floating points of the denominator and numerator are removed, whereby the equation becomes simpler and computing speed becomes improved by 3~9 times.

In addition, in the above equation, since the loop filter does not need to perform division operation, the pixel restored by the equation can be obtained by moving the pixel before being multiplied by $2^8$ by 10 bits, thus acquiring the gain of computational complexity.

In addition, by storing the normalization parameters $\beta_L$, $\beta_R$, $\beta_D$, and $\beta_L$ in a look-up table, computational complexity can be much reduced by reading out the stored normalization parameters from the look-up table without calculating the difference between adjacent pixels and the size of quantization.

As described above, by using the loop filter of the video decoding unit 300 and video decoding unit 300, the prediction residual is decreased, and thus a blocking effect and ring effect are reduced. However, the blocking effect still remains. In order to reduce the remaining blocking effect and ring effect, the post filter of the blocking elimination filter 400 is used.

The post filter restores signal close to the original video by eliminating the blocking effect and ring effect that are not processed by the loop filter.

The post filter performs filtering in the same manner as the above-described loop filter, except that it eliminates not the blocking effect and ring effect of margins between pixels, but the blocking effect and ring effect of all pixels.

Hence, the functional equation for obtaining the original pixel f(i, j) in the post filter is the same as the functional equation for obtaining the original pixel in the loop filter, except for the constant value K of the normalization parameters that determine the degree of smoothing of the original pixel.

The constant value K is determined by experimental values.

The equation for obtaining the original pixel f(i, j) is as follows.

$$f(i,j)=[(2^{10}-\beta_{TOT})g(i,j)+\beta_L(f(i,j))g(i,j-1)+\beta_R(f(i,j))g(i,j+1)+\beta_U(f(i,j))g(i-1,j)+\beta_D(f(i,j))g(i+1,j)]/(2^{10}) \quad (23)$$

$$\beta_{TOT}(f(i,j))=\beta_L(f(i,j))+\beta_R(f(i,j))+\beta_U(f(i,j))+\beta_D(f(i,j)) \quad (24)$$

$$\beta_L(f(i,j))=2^8\alpha_L(f(i,j))=2^8[K_L(f(i,j))QP^2(f(i,j))]/[[g(i,j)-g(i,j-1)]^2+K_L(f(i,j))QP^2(f(i,j))] \quad (25)$$

$$\beta_R(f(i,j))=2^8\alpha_R(f(i,j))=2^8[K_R(f(i,j))QP^2(f(i,j))]/[[g(i,j)-g(i,j-1)]^2+K_R(f(i,j))QP^2(f(i,j))] \quad (26)$$

$$\beta_U(f(i,j))=2^8(f(i,j))=2^8[K_U(f(i,j))QP^2(f(i,j))]/[[g(i,j)-g(i,j-1)]^2+K_U(f(i,j))QP^2(f(i,j))] \quad (27)$$

$$\beta_D(f(i,j))=2^8\alpha_D(f(i,j))=2^8[K_D(f(i,j))QP^2(f(i,j))]/[[g(i,j)-g(i,j-1)]^2+K_D(f(i,j))QP^2(f(i,j))] \quad (28)$$

$$K_L(f(i,j))=[2, \text{ if } j \bmod 4=0;\ 1/2, \text{ otherwise}] \quad (29)$$

$$K_R(f(i,j))=[2, \text{ if } j \bmod 4=3;\ 1/2, \text{ otherwise}] \quad (30)$$

$$K_U(f(i,j))=[2, \text{ if } i \bmod 4=0;\ 1/2, \text{ otherwise}] \quad (31)$$

$$K_D(f(i,j))=[2, \text{ if } i \bmod 4=3;\ 1/2, \text{ otherwise}] \quad (32)$$

$\beta_{TOT}(f(i, j)$ is the sum of normalization parameters that determine the degree of smoothing of a pixel adjacent to the pixel of the compressed video positioned at (i, j).

$\beta_L(f(i, j))$ is a normalization parameter that determine the degree of smoothing of a pixel in the left direction from the pixel of the compressed video positioned at (i, j).

$\beta_R(f(i, j))$ is a normalization parameter that determine the degree of smoothing of a pixel in the right direction from the pixel of the compressed video positioned at (i, j).

$\beta_U(f(i, j))$ is a normalization parameter that determine the degree of smoothing of a pixel in the upper direction from the pixel of the compressed video positioned at (i, j).

$\beta_D(f(i, j))$ is a normalization parameter that determine the degree of smoothing of a pixel in the downward direction from the pixel of the compressed video positioned at (i, j).

$K_L$, $K_R$, $K_U$, and $K_D$ are constant values of normalization parameter $\alpha$ in case of post filtering.

In case of using the loop/post filter, the compressed video signal is restored to the original video signal by the post filtering equation to be outputted, whereby the prediction residual is reduced for thereby increasing compression efficiency, and reducing a blocking effect and ring effect without excessive smoothing.

As described above, in the present invention, a blocking effect and ring effect of the H.26L moving video compression type can be eliminated, and a more improved video quality can be acquired by applying the method for restoring the original pixel by the normalization restoration method to the system employing the H.26L compression.

In addition, the normalization parameters that determine the degree of smoothing can be stored in the look-up table and can be detected according to the difference between pixels adjacent to the original pixel and the size of quantizaiton, whereby the equation for restoring the compressed moving video, resulting in excessive smoothing, becomes simpler, and filtering control is made possible by a simple equation, thus making a high speed real time video processing possible.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

[[1. A method for reducing a blocking effect in a compressed video signal, comprising:

the decoding step of restoring a motion compensated video signal to an original video signal by reducing the prediction residual between the motion compensated video signal and the original video signal and the blocking effect; and the post-filtering step of performing post-filtering in a blocking elimination filter to reduce a blocking effect and ring effect remained in the compensated signal, wherein the decoding step comprises, considering the direction of a pixel adjacent to the original pixel of the video signal to be restored, defining an additional function of the reliability and degree of smoothing of each pixel adjacent to the original pixel, obtaining a normalization parameter $\alpha$ that gives a weight value to the reliability and degree of smoothing of the original video signal using the additional function, calculating a pixel to be restored according to the normalization parameter $\alpha$, compressed video signal, and size of quantization using a function, and designating values of the normalization parameter $\alpha$ by differently setting the degree of smoothing based on the position of the pixel to be restored in response to the position of the reference pixel.]]

[[2. The method according to claim 1, wherein the decoding step comprises:

designating constant values of the normalization parameter $\alpha$ that differently setting the degree of smoothing based on the position of the pixel to be restored in response to the position of the reference pixel and the form of a filter;

applying a 8-bit value to the function for calculating the pixel to be processed; and performing loop filtering of the pixel positioned in block margins encoded to intra macroblock in a decoding unit.]]

[[3. The method according to claim 1, wherein the pixel to be restored is calculated by:

$$f(i,j)=[(4-\alpha_{TOT}g(i,j)+\alpha_L(f(i,j))g(i,j-1)+\alpha_R(f(i,j))g(i,j+1)+\alpha_U(f(i,j))g(i-1,j)+\alpha_D f(i,j))g(i+1,j)]/4$$

$$\alpha_{TOT}(f(i,j))=\alpha_L(f(i,j))+\alpha_R(f(i,j+\alpha_U(f(i,j))+\alpha_D f(i,j)),$$

in which f(I, j) is a pixel to be restored, $\alpha_{TOT}$ is the sum of parameters for each pixel, $\alpha_L$ is a normalization parameter that determines the degree of smoothing of a pixel in the left direction from the pixel of the compressed video signal positioned at (i, j), $\alpha_R$ is a normalization parameter that determines the degree of smoothing of a pixel in the right direction from the pixel of the compressed video signal positioned at (i, j), $\alpha_U$ i s a normalization parameter that determines the degree of smoothing of a pixel in the upper direction from the pixel of the compressed video signal positioned at (i, j), and $\alpha_D$ is a normalization parameter that determines the degree of smoothing of a pixel in the downward direction from the pixel of the compressed video signal positioned at (i, j).]]

[[4. The method according to claim 3, wherein the normalization parameter for each pixel is obtained by:

$$\alpha_L(f(i,j)=[K_L QP^2(f(i,j))]/[[g(i,j)-g(i,j-1)]^2+K_L QP^2(f,(i,j))]$$

$$\alpha_R(f(i,j)=[K_R QP^2(f(i,j))]/[[g(i,j)-g(i,j+1)]^2+K_R QP^2(f,(i,j))]$$

$$\alpha_U(f(i,j)=[K_U QP^2(f(i,j))]/[[g(i,j)-g(i-1,j)]^2+K_U QP^2(f,(i,j))]$$

$$\alpha_D(f(i,j)=[K_D QP^2(f(i,j))]/[[g(i,j)-g(i+1,j)]^2+K_D QP^2(f(i,j))]$$

in which K is a constant value of normalization parameter $\alpha$ for each pixel, and QP(f(i, j)) is the size of quantization of pixel encoded to intra macroblock, the normalization parameter, e.g., a weight value representing the ratio of reliability of a pixel with respect to the original pixel, having a higher degree of smoothing as it grows.]]

[[5. The method according to claim 4, wherein the size of quantization of the pixel positioned at (i, j) encoded to intra macroblocks is obtained by QP(f(i,j))=[676]/[A(f(i, j))], in which A is a quantizer, and QP(f(i, j)) is calculated by the quantizer defined in the H.26L compression method.]]

[[6. The method according to claim 4, wherein the constant value K of the normalization parameter is obtained by experimental values by:

$$K_L(f(i,j))=[2, \text{ if } j \bmod 4=0;\ 0, \text{ otherwise}]$$

$$K_R(f(i,j))=[2, \text{ if } j \bmod 4=3;\ 0, \text{ otherwise}]$$

$$K_U(f(i,j))=[2, \text{ if } i \bmod 4=0;\ 0, \text{ otherwise}]$$

$$K_D(f(i,j))=[2, \text{ if } i \bmod 4=3;\ 0, \text{ otherwise}].]]$$

[[7. The method according to claim 1, wherein a pixel to be processed is expressed by applying a 8-bit value by:

$$f(i, j)=[(2^{10}-\beta_{TOT})g(i, j)+\beta_L(f(i, j))g(i, j-1)+\beta_R(f(i, j))g(i, j+1)+\beta_U(f(i, j))g(i-1, j)+\beta_D(f(i, j))g(i+1, j)]/(2^{10})\ \beta_{TOT}(f(i, j))=\beta_L(f(i, j))+\beta_R(f(i, j))+\beta_U(f(i, j))+\beta_D(f(i, j))$$

in which, $\beta_{TOT}(f(i, j))$ is the sum of normalization parameters that determine the degree of smoothing of a pixel adjacent to the pixel of the compressed video signal positioned at (i, j), $\beta_L(f(i, j))$ is a normalization parameter that determine the degree of smoothing of a pixel in the left direction from the pixel of the compressed video signal positioned at (i, j), $\beta_R(f(i, j))$ is a normalization parameters that determine the degree of smoothing of a pixel in the right direction from the pixel of the compressed video signal positioned at (i, j), $\beta_U(f(i, j))$ is a normalization parameters that determine the degree of smoothing of a pixel in the upper direction from the pixel of the compressed video signal positioned at (i, j), and $\beta_D(f(i, j))$ is the sum of normalization parameters that determine the degree of smoothing of a pixel in the downward direction from the pixel of the compressed video signal positioned at (i, j), and in which the equation is made simpler by performing loop filtering by multiplying the denominator and the numerator by a 8-bit value.]]

[[8. The method according to claim 7 wherein each of the normalization parameters is obtained by:

$$\beta_L(f(i,j))=2^8\alpha_L(f(i,j))=2^8[K_L(f(i,j))QP^2(f(i,j))]/[[g(i,j)-g(i,j-1)]^2+K_L(f(i,j))QP^2(f(i,j))]$$

$$\beta_R(f(i,j))=2^8\alpha_R(f(i,j))=2^8[K_R(f(i,j))QP^2(f(i,j))]/[[g(i,j)-g(i,j-1)]^2+K_R(f(i,j))QP^2(f(i,j))]$$

$$\beta_U(f(i,j))=2^8\alpha_U(f(i,j))=2^8[K_U(f(i,j))QP^2(f(i,j))]/[[g(i,j)-g(i,j-1)]^2+K_U(f(i,j))QP^2(f(i,j))]$$

$$\beta_D(f(i,j))=2^8\alpha_D(f(i,j))=2^8[K_D(f(i,j))QP^2(f(i,j))]/[[g(i,j)-g(i,j-1)]^2+K_D(f(i,j))QP^2(f(i,j))],$$

in which the degree of smoothing is determined by the normalization parameters.]]

[[9. The method according to claim 1, wherein the post-filtering step comprises the steps of:

defining an additional function of a pixel to be restored of a signal decoded by means of loop-filtering of the video signal decoding unit;

determining the constant value of the normalization parameter that differently sets the reliability and degree of smoothing of all pixels with respect to the original video signal; and performing post-filtering by the function for calculating the pixel to be restored containing the determined constant value.]]

[[10. The method according to claim 9, wherein the constant value of the normalization parameter that differently sets the reliability and degree of smoothing of all pixels with respect to the original video signal is determined by experimental values, and is calculated by:

$$K_L(f(i,j))=[2, \text{ if } j \bmod 4=0;\ ½, \text{ otherwise}]$$

$$K_R(f(i,j))=[2, \text{ if } j \bmod 4=3;\ ½, \text{ otherwise}]$$

$$K_U(f(i,j))=[2, \text{ if } i \bmod 4=0;\ ½, \text{ otherwise}]$$

$$K_D(f(i,j))=[2, \text{ if } i \bmod 4=3;\ ½, \text{ otherwise}]$$

whereby the degree of non-uniformity of each pixel is improved.]]

[[11. The method according to claim 1, wherein each of the normalization parameters is obtained by:

$$\beta_L(f(i,j))=2^8\alpha_L(f(i,j))=2^8[K_L(f(i,j))QP^2(f(i,j))]/[[g(i,j)-g(i,j-1)]^2+K_L(f(i,j))QP^2(f(i,j))]$$

$$\beta_R(f(i,j))=2^8\alpha_R(f(i,j))=2^8[K_R(f(i,j))QP^2(f(i,j))]/[[g(i,j)-g(i,j-1)]^2+K_R(f(i,j))QP^2(f(i,j))]$$

$$\beta_U(f(i,j))=2^8\alpha_U(f(i,j))=2^8[K_U(f(i,j))QP^2(f(i,j))]/[[g(i,j)-g(i,j-1)]^2+K_U(f(i,j))QP^2(f(i,j))]$$

$$\beta_D(f(i,j))=2^8\alpha_D(f(i,j))=2^8[K_D(f(i,j))QP^2(f(i,j))]/[[g(i,j)-g(i,j-1)]^2+K_D(f(i,j))QP^2(f(i,j))],$$

in which the degree of smoothing is determined by the normalization parameters.]]

[[12. A method for reducing a blocking effect in a compressed video signal, comprising:

the decoding step of restoring a motion compensated video signal to an original video signal by reducing the prediction residual between the motion compensated video signal and the original video signal and the blocking effect; and the post-filtering step of performing post-filtering in a blocking elimination filter to reduce a blocking effect and ring effect remained in the compensated signal, wherein a pixel to be processed is expressed by applying a 8-bit value by:

$$f(i,j)=[(2^{10}-\beta_{TOT})g(i,j)+\beta_L(f(i,j))g(i,j-1)+\beta_R(f(i,j))g(i,j+1)+\beta_U(f(i,j))g(i-1,j)+\beta_D f(i,j))g(i+1,j)]/2^{10}$$

$$\beta_{TOT}(f(i,j))=\beta_L(f(i,j))+\beta_R(f(i,j))+\beta_U(f(i,j))+\beta_U(f(i,j))$$

in which, $\beta_{TOT}(f(i, j))$ is the sum of normalization parameters that determine the degree of smoothing of a pixel adjacent to the pixel of the compressed video signal positioned at (i, j), $\beta_L(f(i, j))$ is a normalization parameter that determine the degree of smoothing of a pixel in the left direction from the pixel of the compressed video signal positioned at (i, j), $\beta_R(f(i, j))$ is a normalization parameters that determine the degree of smoothing of a pixel in the right direction from the pixel of the compressed video signal positioned at (i, j), $\beta_U(f(i, j))$ is a normalization parameters that determine the degree of smoothing of a pixel in the upper direction from the pixel of the compressed video signal positioned at (i, j), and $\beta_D(f(i, j))$ is the sum of normalization parameters that determine the degree of smoothing of a pixel in the downward direction from the pixel of the compressed video signal positioned at (i, j), and in which the equation is made simpler by performing loop filtering by multiplying the denominator and the numerator by a 8-bit value.]]

13. *A method for reducing a blocking effect in a video signal* by a video decoding apparatus, *the method comprising:*

*receiving*, by the video decoding apparatus, *a compressed video signal; and*

*generating*, by the video decoding apparatus, *a reconstructed video signal from the compressed video signal*[[:]],

*wherein* said *generating the reconstructed video signal comprises* deblocking filtering including:

obtaining at least one parameter *determining degree of smoothing* [[*information*]] *for a pixel to be filtered using a look-up table based on quantization information of a region including the pixel to be filtered,* [[*and*]] the at least one parameter being stored in the look-up table and being identified from the look-up table using the quantization information, the quantization information being a quantization parameter (QP) applied to transform coefficient information in a frequency domain,

*obtaining a value of the pixel to be filtered based on the* [[*degree of smoothing information*]] at least one parameter, *information regarding a first adjacent pixel, and information regarding a second opposing adjacent pixel*, and obtaining the reconstructed video signal based at least in part on the value obtained for the pixel to be filtered.

14. *The method of claim 13, wherein* said obtaining the at least one parameter *determining the degree of smoothing* [[ *information*]] *comprises retrieving predetermined normalization parameters from the look-up table.*

15. *The method of claim 13, wherein the first and second adjacent pixels are located in a horizontal direction with respect to the pixel to be filtered.*

16. *The method of claim 13, wherein the first and second adjacent pixels are located in a vertical direction with respect to the pixel to be filtered.*

17. *The method of claim 13, wherein the information regarding the first adjacent pixel* comprises a difference between the pixel to be filtered and the first adjacent pixel *and the information regarding the second adjacent pixel comprises* [[*a difference between the pixel to be filtered and the first adjacent pixel and*]] *a difference between the pixel to be filtered and the second adjacent pixel.*

18. The method of claim 13, further comprising obtaining the at least one parameter *determining the degree of smoothing* [[*information*]] *based on constant values, the constant values being determined by experimentally-determined values obtained by a loop filter.*

19. *An apparatus for reducing a blocking effect in a video signal, the apparatus comprising a deblocking filter connected for use in generating a reconstructed video signal from a compressed video signal, wherein the deblocking filter is configured to* [[*determine*]] obtain at least one parameter determining *degree of smoothing* [[*information*]] *for a pixel to be filtered using a look-up table based on quantization information of a region including the pixel to be filtered* [[*and*]], the at least one parameter being stored in the look-up table and being identified from the look-up table using the quantization information, the quantization information being a quantization parameter (QP) applied to transform coefficient information in a frequency domain, *to obtain a value of the pixel to be filtered based on the* [[*degree of smoothing information*]] at least one parameter, *information regarding a first adjacent pixel, and information regarding a second opposing adjacent pixel*, and to obtain the reconstructed video signal based at least in part on the value obtained for the pixel to be filtered.

20. *The apparatus of claim 19, wherein the deblocking filter is configured to retrieve pre-determined normalization parameters from the look-up table.*

21. *The apparatus of claim 19, wherein the first and second adjacent pixels are located in a horizontal direction with respect to the pixel to be filtered.*

22. *The apparatus of claim 19, wherein the first and second adjacent pixels are located in a vertical direction with respect to the pixel to be filtered.*

23. *The apparatus of claim 19, wherein the information regarding the first adjacent pixel* comprises a difference between the pixel to be filtered and the first adjacent pixel *and the information regarding the second adjacent pixel comprises* [[*a difference between the pixel to be filtered and the first adjacent pixel and*]] *a difference between the pixel to be filtered and the second adjacent pixel.*

24. *The apparatus of claim 19, wherein the deblocking filter is configured to* [[*determine*]] obtain the at least one parameter determining *the degree of smoothing* [[*information*]] *based on constant values, the constant values being determined by experimentally-determined values obtained by a loop filter.*

25. *A method for reducing a blocking effect in a video signal, the method comprising:*

*receiving a compressed video signal; and*

*generating, by one or more processors, a reconstructed video signal from the compressed video signal*[[;]],

*wherein* said *generating the reconstructed video signal comprises* deblocking filtering including:

obtaining at least one parameter *determining degree of smoothing* [[*information*]] *for a pixel to be filtered using a look-up table based on quantization information of a region including the pixel to be filtered,* [[*and*]] the at least one parameter being stored in the look-up table and being identified from the look-up table using the quantization information, the quantization information being a quantization parameter (QP) applied to transform coefficient information in a frequency domain,

*obtaining a value of the pixel to be filtered based on the* [[*degree of smoothing information*]] at least one parameter*, information regarding a first adjacent pixel, and information regarding a second opposing adjacent pixel*, and obtaining the reconstructed video signal based at least in part on the value obtained for the pixel to be filtered.

26. *A method for reducing a blocking effect in a video signal* by a video decoding apparatus*, the method comprising:*

*receiving*, by the video decoding apparatus, *a compressed video signal;*

*identifying*, by the video decoding apparatus, *a pixel to be filtered;*

*determining*, by the video decoding apparatus, *quantization information of a region including the pixel to be filtered*, the quantization information being a quantization parameter (QP) applied to transform coefficient information in a frequency domain*;***

*accessing*, by the video decoding apparatus, *a look-up table;* obtaining, by the video decoding apparatus, at least one parameter *determining,* [[*based on information identified from within the look-up table,*]] *a degree of smoothing* [[*information*]] *for the pixel to be filtered*, the at least one parameter being stored in the look-up table and being identified from the look-up table using the quantization information*;***

*accessing*, by the video decoding apparatus, *information regarding a first adjacent pixel;*

*accessing*, by the video decoding apparatus, *information regarding a second opposing adjacent pixel;*

*obtaining*, by the video decoding apparatus, *a value of the pixel to be filtered based on the* [[*degree of smoothing information determined*]] at least one parameter*, the information regarding the first adjacent pixel, and the information regarding the second opposing adjacent pixel; and*

*generating*, by the video decoding apparatus, *a reconstructed video signal based at least in part on the value obtained for the pixel to be filtered.*

27. The method of claim 13, further comprising:

performing, by the video decoding apparatus, a post filtering of the reconstructed video signal in a same manner as said generating the reconstructed video signal.

28. The method of claim 13, wherein the deblocking filtering is performed for a pixel at a block boundary based on the at least one parameter.

29. The apparatus of claim 19, further comprising:

a post filter configured to perform a post filtering of the reconstructed video signal in a same manner as the deblocking filter.

30. The method of claim 25, wherein the deblocking filtering is performed for a pixel at a block boundary based on the at least one parameter.

* * * * *